United States Patent

Tanaka et al.

[11] Patent Number: 5,846,347
[45] Date of Patent: Dec. 8, 1998

[54] ALUMINUM BASE ALLOY BEARING HAVING SUPERIOR LOAD-RESISTANCE AND METHOD OF PRODUCING THE SAME

[75] Inventors: Tadashi Tanaka, Konan; Masaaki Sakamoto, Nagoya; Tohru Kato, Seto; Yoshiaki Sato, Gifu, all of Japan

[73] Assignee: Daido Metal Company Ltd., Nagoya, Japan

[21] Appl. No.: 68,091

[22] Filed: May 28, 1993

[30] Foreign Application Priority Data

Jun. 1, 1992 [JP] Japan .................................. 4-140505

[51] Int. Cl.$^6$ .................................................. C22C 21/06
[52] U.S. Cl. .......................... 148/439; 148/535; 428/636; 428/652; 428/654
[58] Field of Search .................................. 148/439, 535; 428/636, 652, 654

[56] References Cited

U.S. PATENT DOCUMENTS

| 4,170,469 | 10/1979 | Mori ........................................ 148/535 |
| 4,786,340 | 11/1988 | Ogawa et al. .......................... 148/439 |
| 5,028,393 | 7/1991 | Tanaka et al. ........................... 148/439 |
| 5,110,372 | 5/1992 | Faure ....................................... 148/535 |

FOREIGN PATENT DOCUMENTS

| 1953447 | 5/1970 | Germany . |
| 2809866 | 2/1979 | Germany . |
| 1775322 | 6/1982 | Germany . |
| 4004703 | 9/1990 | Germany . |
| 4037746 | 6/1991 | Germany . |
| 3-6345 | 1/1991 | Japan . |
| 0476930 | 3/1936 | United Kingdom . |
| 1434254 | 10/1973 | United Kingdom . |
| 1593006 | 2/1978 | United Kingdom . |
| 1593006 | 7/1981 | United Kingdom . |
| 2233667 | 1/1991 | United Kingdom . |

OTHER PUBLICATIONS

VDI-Z., vol. 98, 1956, No. 1, Jan. 1, pp. 19 and 20.
KH.G. Schmitt–Thomas: Werkstoffkunde III, Technical University of Munich: Professorhip for Metallurgy and Physical Metallurgy, 1983, pp. 148–157.
Ullmanns Encyklopeadie der technischen Chemie, 4th ed., vol. 16, Verlag Chemie GmbH, Weinheim, 1978, pp. 2 and 3.
DE–AN W 1271, laid–open: Sep. 27, 1951.

Primary Examiner—Sikyin Ip
Attorney, Agent, or Firm—Browdy and Neimark

[57] ABSTRACT

A multi-layered bearing having superior load-resistance comprises an aluminium base bearing alloy layer and a backing metal layer. The bearing alloy consists essentially of, by weight, 2–8% zinc, 0.1–8% silicon, 0.1–3% copper, 0.05–3% magnesium and the balance of aluminium. The bearing alloy is subjected to a solution treatment and an artificial aging treatment, and it has a hardness of Hv 70 or greater. The bearing alloy may contain at least one element selected from the following five elements of lead, manganese, vanadium, chromium and nickel, and may further contain strontium and/or titanium and boron. The hardness of the bearing alloy may be Hv 70 or higher by performing solution treatment on a bimetal at a temperature of 400° C. or higher before the plastic working, and further by performing an artificial aging treatment thereon at a temperature of 250° C. or lower.

16 Claims, 1 Drawing Sheet

* THE DISTAL END OF EACH ARROW INDICATES THE MAX. LOAD WHICH DOES NOT CAUSE FATIGUE

* THE DISTAL END OF EACH ARROW INDICATES THE MAX. LOAD WHICH DOES NOT CAUSE FATIGUE

ALUMINUM BASE ALLOY BEARING HAVING SUPERIOR LOAD-RESISTANCE AND METHOD OF PRODUCING THE SAME

BACKGROUND OF THE INVENTION

1. Field of the Invention

The present invention relates to an aluminium base alloy bearing having superior load-resistance used for a high power engine of a vehicle or a general industrial machine and relates to a method of producing materials for obtaining such a bearing.

2. Description of the Related Art

Aluminium-zinc materials are known to the prior art which is related to the present invention. For example, West Germany Patent Nos. 1533413 and 1558696, and JP-A-3-6345 disclose bearing alloys in which various elements are added to an alloy composition basically composed of aluminium and zinc, thereby producing a bearing having characteristics used as a plain bearing.

However, these days, internal combustion engines of vehicles and general industrial machines are operating at higher speeds and powers so that plain bearings having characteristics which are able to respond to such engines are coming into a great demand. Conventional plain bearings do not necessarily meet such demands and have problems such as, in particular, low fatigue resistance under harsh operating conditions.

SUMMARY OF THE INVENTION

An object of the present invention resides in providing an aluminium base alloy bearing having superior-load-resistance which is able to be used even in engines of high speed and high power.

In the light of the object, according to the present invention, the following bearing is provided.

An aluminium base alloy-multi-layered bearing having superior load resistance including a bearing-alloy layer and a back metal, the bearing consisting essentially of, by weight, 2–8% zinc, 0.1–8% silicon, 0.1–3% copper, 0.05–3% magnesium and the balance of aluminium, wherein the bearing-alloy layer is subjected to a solution treatment and an artificial aging treatment, and wherein the bearing-alloy layer has a hardness of Hv 70 or higher.

An alloy which is applied to the bearing-alloy layer is not limited to the foregoing composition, alternatively, the following three modifications may be utilized.

1. In addition to the foregoing, zinc, silicon, copper, magnesium and aluminium, the bearing may contain at least one element selected from the following five alloying elements consisting of 0.1–3% lead, 0.1–2% manganese, 0.1–2% vanadium, 0.1–2% chromium, 0.1–3% nickel.
2. In addition to the foregoing zinc, silicon, copper, magnesium and aluminium, the bearing may contain only strontium, or titanium and boron, or all the elements selected from the alloying elements consisting of 0.005–0.5% strontium, 0.01–0.2% titanium, 0.001–0.05% boron.
3. In addition to the foregoing zinc, silicon, copper, magnesium and aluminium, the bearing may contain at least one alloying element selected from the following five elements consisting of 0.1–3% lead, 0.1–2% manganese, 0.1–2% vanadium, 0.1–2% chromium, 0.1–3% nickel, and only strontium, or titanium and boron, or all the elements (that is, all of the elements, strontium, titanium and boron) selected from the elements consisting of 0.005–0.5% strontium, 0.01–0.2% titanium, 0.001–0.05% boron.

Also, it is effective for improving the bonding relationship to intervene an intermediate bonding layer between the bearing-alloy layer and the backing metal layer. The intermediate bonding layer is formed of aluminium, an aluminium alloy, or nickel. An overlay may be provided on the bearing-alloy layer for improving the initial bearing characteristics, and tin, lead, or an alloy composed mainly of either of these elements, are used for such a purpose. Further, a flash plating layer composed of tin or lead may be formed on the surface of the bearing.

In general, a multi-layered bearing material comprising a bearing-alloy layer and a backing metal layer can be produced by the following method. A bearing alloy plate and a metallic plate for a backing metal are overlapped (The intermediate bonding layer may be intervened if necessary.). The bearing-alloy layer and the metallic plate are bonded integrally by performing a rolling process. However, in the present invention, a bearing-alloy layer having superior load resistance with Hv 70 or greater hardness can be obtained by the following additional process. After the rolling process as described above, a solution treatment is performed on the bearing alloy by heating a laminated body consisting of the bearing alloy plate and the backing metal layer at a temperature of 400° C. or higher, and an artificial aging treatment is further performed at a temperature of 250° C. or lower.

DESCRIPTION OF THE PREFERRED EMBODIMENTS

Figure 1:
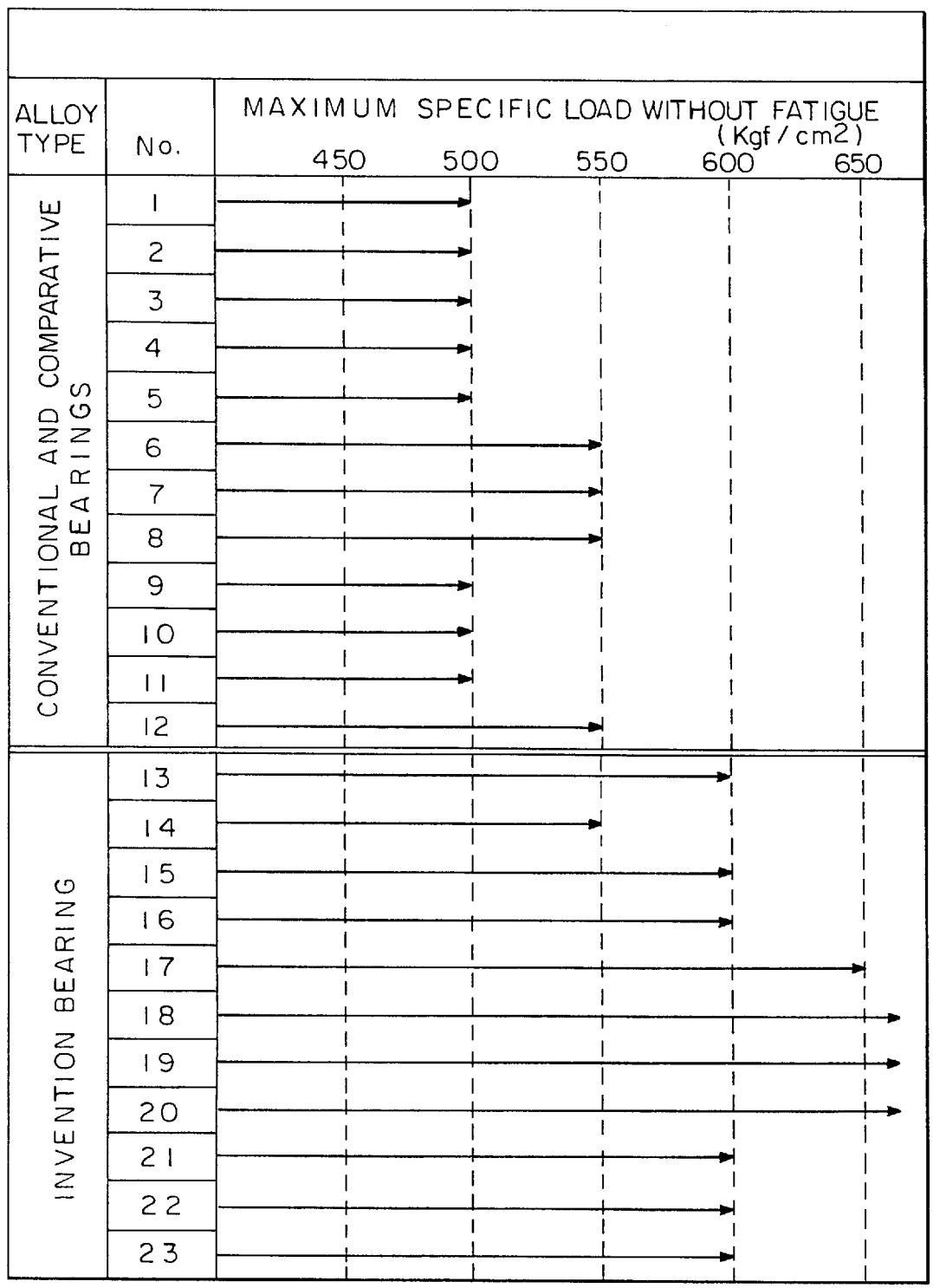
FIG. 1 shows the result of a fatigue test on the conventional composite bearings and composite bearings according to the present invention.

The present alloy is preferred for the following reasons.

(1) Zinc: 2–8% by weight

Zinc dissolves into aluminium matrix so that it alters the space lattice distance and maintaining adhesion-resistance properties. Furthermore, zinc oxidizes in preference to aluminium as to prevent generation of a hard aluminium oxide film which is harmful to bearings. Also, it possesses characteristics of improving the affinity of the alloy for lubricant oil. Less than 2% of an additive amount of zinc is not able to obtain the foregoing effects. On the other hand, more than 8% of the additive amount might cause stress corrosion cracking (in particular, cracking after heat treatment) and also reduce toughness. Moreover, when an overlay formed of a soft material is coated on the surface of the bearing alloy, it deteriorates adhesive properties of overlays such as electroplated coating or the like. Further, more than 8% of zinc adversely affects on adhesion properties in roll bonding.

(2) Silicon: 0.1–8% by weight

Silicon dissolves into aluminium matrix and is crystallized as hard silicon grains, thereby increasing the strength of an alloy. When silicon grains are distributed in the matrix, only the aluminium matrix being relatively soft wears so as to form a surface with undulation in microstructure. Projections of silicon in the undulation withstand a heavy load while they maintain anti-adhesive properties, whereas the recesses function as oil reservoirs so that the projections withstand a heavy load, a thin oil film and also metal-to-metal contacting conditions. Finely distributed silicon grains serve the function of polishing edges and burrs of a mating shaft and improve anti-seizuring properties. Also, when the aluminium matrix and the mating shaft are brought into metal-to-metal contact for an instant with each other, seizuring and fluidity of the bearing alloy can be prevented because of the anti-adhesive properties provided for the surface of silicon and anti-fluidity provided for the aluminium matrix having silicon as a core inside of the matrix. Less than 0.1% of the additive amount of silicon is not able to obtain the foregoing effects. More than 8% of the additive amount makes the alloy brittle so that it reduces fatigue-to-impact strength, and lacks toughness, and thus further decreasing plastic workability by rolling or the like.

(3) Copper: 0.1–3% by weight

Copper increases the strength of the aluminium matrix and also it is extremely effective to increase fatigue strength. However, copper might make an alloy excessively hard, thus deteriorating conformability of the alloy to a mating member. A compound of part of copper and aluminium is produced, which greatly contributes to strengthening the alloy achieved by solution treatment and artificial aging treatment. Less than 0.1% of the additive amount of copper is unable to obtain the foregoing effects. On the other hand, more than 3% of the additive amount makes the alloy excessively hard which deteriorates conformability to the mating member and reduces plastic workability of the alloy.

(4) Magnesium: 0.05–3% by weight

Magnesium dissolves into the aluminium matrix or precipitates as an intermetallic compound, thereby increasing fatigue strength. Magnesium also produces a compound together with silicon or zinc, and such a compound contributes to strengthening the alloy achieved by the solution treatment and the artificial aging treatment. Less than 0.05% of an additive amount of magnesium is unable to obtain the foregoing effects. More than 3% of the additive amount makes the alloy excessively hard, thus deteriorating conformability which further reduces plastic workability and casting properties.

(5) Lead: 0.1–3% by weight

Lead improves machinability and anti-seizure properties. Less than 0.1% of an additive amount of lead is unable to obtain such effects. On the other hand, if the additive amount is more than 3%, it is very difficult to distribute lead evenly on the aluminium matrix and the excessive additive amount further reduces the strength of the alloy.

(6) Manganese, vanadium and chromium : 0.1–2% by weight, respectively

These elements dissolve into the aluminium matrix or precipitate as intermetallic compounds, thereby increasing fatigue strength of the alloy. They also inhibit stress corrosion cracking of the alloy. Less than 0.1% of an additive amount of these elements is unable to obtain such effects, whereas more than 2% of the additive amount coarsens the intermetallic compounds and makes the alloy brittle.

(7) Nickel: 0.1–3% by weight

Nickel increases the strength of the aluminium matrix. It is extremely effective to improve fatigue strength of the alloy. However, it might make the alloy too hard, thereby deteriorating conformability of the alloy to a mating member. Less than 0.1% of an additive amount of nickel is unable to obtain the foregoing effects, whereas more than 3% of the additive amount makes the alloy excessively hard, thus deteriorating conformability of the alloy to the mating member and further reducing plastic workability.

The reason for which heat treatment is required for the bearing aluminium alloy layer is as follows and a temperature of the heat treatment is defined by the following reasons. It is better to take distortion due to heat into consideration and perform heat treatment at the stage of processing a formed bimetal, before a final plastic working.

1. If the solution treatment is performed at a temperature of less than 400° C. followed by quenching, the foregoing effects cannot be obtained.
2. On the other hand, if the artificial aging treatment is performed at a temperature of more than 250° C., it might soften the alloy.
3. An alloy having lower strength such that its hardness increases by the heat treatment or such that Vickers hardness (Hv) is less than 70, is susceptible to fatigue for use under a heavy load for the purpose of the present invention.

EXAMPLE

A more specific description will be given hereinafter with reference to the example.

Aluminium alloy plates having the chemical compositions shown in Table 1 were prepared by casting and rolling processes. The resulting rolled plates were bonded to backing steel plates, respectively, by rolling so as to form composite materials (bimetals) which were then annealed at a temperature of 350° C. As a result, comparative bearings No. 1–11 having the bearing-alloy layers of the compositions shown in Table 1 were obtained. Also, a composite material was obtained by employing substantially the same method as the foregoing method, followed by heating at a temperature of 380° C., rapid cooling, and subsequent artificial aging treatment for four hours at a temperature of 175° C. As a result, a comparative bearing No. 12 having the bearing-alloy layer of the composition shown in Table 1 was obtained.

Furthermore, composite materials were obtained by employing substantially the same method as the foregoing method, followed by solution treatment at a temperature of 450° C., rapid cooling, and subsequent artificial aging treatment for four hours at a temperature of 175° C. As a result, bearings of the present invention No. 13–23 having the bearing-alloy layers of the compositions shown in Table 1 were obtained. It should be noted that in this example, the heat treatment such as the solution treatment and the artificial aging treatment was performed in the bearings according to the present invention, but alternatively, the composite materials of the present invention may be annealed together with the conventional composite materials for approximately four hours at a temperature of 300° C.–400° C.

Afterwards, the completed composite materials (bimetals), both of the comparative bearings, and the bearings of the present invention which have the bearing-alloy layers of the compositions are formed into a semi-circular shape with an inner diameter of 53 mm and a width of 17 mm by machining, followed b coating an overlay having a thickness of 15 $\mu$m–20 $\mu$m formed of a lead-tin alloy on the inner surface of the composite materials. Thus, composite bearings were obtained.

A fatigue test was performed on these semi-circular composite bearings. The test conditions are shown in Table 2 and the test results are shown in FIG. 1.

In this example, the bearing aluminium alloys and the backing steel plates were directly bonded to each other by rolling, respectively. However, a known method is recommended for improving bonding performance such that they are bonded to each other by intervening nickel plating or aluminium foil instead of performing direct bonding by rolling. Likewise, an intermediate plating layer formed of a nickel, copper, or the like, may be intervened between a bearing aluminium alloy and a lead-tin alloy overlay for improving bonding property.

TABLE 1

| No. | Al | Zn | Si | Cu | Mg | Pb | Mn | V | Cr | Ni | Sr | Ti | B | Alloy Hardness | Treatment of bimetal I | II |
|---|---|---|---|---|---|---|---|---|---|---|---|---|---|---|---|---|
| Conventional and comparative berings | | | | | | | | | | | | | | | | |
| 1 | Bal. | 2 | 2 | 2 | 3 | 0.8 | — | — | 2 | — | — | — | — | 48 | 350° C. × 4 hr | — |
| 2 | Bal. | 2 | 3 | 1 | 1.5 | — | — | — | — | — | — | — | — | 44 | 350° C. × 4 hr | — |
| 3 | Bal. | 2 | 8 | 0.1 | 1 | — | — | — | — | — | 0.5 | — | — | 51 | 350° C. × 4 hr | — |
| 4 | Bal. | 3 | 3 | 0.8 | 0.1 | 3 | 2 | — | — | — | — | — | — | 50 | 350° C. × 4 hr | — |
| 5 | Bal. | 3 | 1 | 3 | 0.05 | 1.5 | — | 0.3 | 0.2 | — | — | — | — | 55 | 350° C. × 4 hr | — |
| 6 | Bal. | 4 | 5 | 1 | 0.3 | 0.5 | 0.2 | — | — | — | — | 0.2 | 0.05 | 60 | 350° C. × 4 hr | — |
| 7 | Bal. | 4 | 6 | 1.2 | 0.5 | 1 | — | — | — | 0.1 | — | 0.08 | — | 61 | 350° C. × 4 hr | — |
| 8 | Bal. | 4 | 3 | 0.8 | 0.8 | 0.1 | — | — | — | 3 | — | 0.04 | 0.01 0.001 | 58 | 350° C. × 4 hr | — |
| 9 | Bal. | 4 | 0.1 | 2 | 2 | 1.2 | 0.1 | 2 | — | — | — | — | — | 56 | 350° C. × 4 hr | — |
| 10 | Bal. | 6 | 4 | 0.5 | 1 | 1 | — | — | — | — | 0.1 | 0.005 | — | 53 | 350° C. × 4 hr | — |
| 11 | Bal. | 8 | 1.5 | 1 | 0.5 | 0.8 | — | 0.1 | — | — | — | — | — | 50 | 350° C. × 4 hr | — |
| 12 | Bal. | 4 | 5 | 1 | 0.3 | 0.5 | 0.2 | — | — | — | — | 0.2 | 0.05 | 61 | 380° C. → R.Q. | 175° C. × 4 hr |
| Invention bearing | | | | | | | | | | | | | | | | |
| 13 | Bal. | 2 | 2 | 2 | 3 | 0.8 | — | — | 2 | — | — | — | — | 75 | 450° C. → R.Q. | 175° C. × 4 hr |
| 14 | Bal. | 2 | 3 | 1 | 1.5 | — | — | — | — | — | — | — | — | 71 | 450° C. → R.Q. | 175° C. × 4 hr |
| 15 | Bal. | 2 | 8 | 0.1 | 1 | — | — | — | — | — | 0.5 | — | — | 78 | 450° C. → R.Q. | 175° C. × 4 hr |
| 16 | Bal. | 3 | 3 | 0.8 | 0.1 | 3 | 2 | — | — | — | — | — | — | 71 | 450° C. → R.Q. | 175° C. × 4 hr |
| 17 | Bal. | 3 | 1 | 3 | 0.05 | 1.5 | — | 0.3 | 0.2 | — | — | — | — | 79 | 450° C. → R.Q. | 175° C. × 4 hr |
| 18 | Bal. | 4 | 5 | 1 | 0.3 | 0.5 | 0.2 | — | — | — | — | 0.2 | 0.05 | 84 | 450° C. → R.Q. | 175° C. × 4 hr |
| 19 | Bal. | 4 | 6 | 1.2 | 0.5 | 1 | — | — | — | 0.1 | — | 0.08 | — | 90 | 450° C. → R.Q. | 175° C. × 4 hr |
| 20 | Bal. | 4 | 3 | 0.8 | 0.8 | 0.1 | — | — | — | 3 | — | 0.04 | 0.01 0.001 | 80 | 450° C. → R.Q. | 175° C. × 4 hr |
| 21 | Bal. | 4 | 0.1 | 2 | 2 | 1.2 | 0.1 | 2 | — | — | — | — | — | 76 | 450° C. → R.Q. | 175° C. × 4 hr |
| 22 | Bal. | 6 | 4 | 0.5 | 1 | 1 | — | — | — | — | 0.1 | 0.005 | — | 76 | 450° C. → R.Q. | 175° C. × 4 hr |
| 23 | Bal. | 8 | 1.5 | 1 | 0.5 | 0.8 | — | 0.1 | — | — | — | — | — | 78 | 450° C. → R.Q. | 175° C. × 4 hr |

*R.Q.: Rapid cooling

TABLE 2

| Fatigue test | |
|---|---|
| Test machine: | Dyanmic load fatigue testing machine |
| Rotation speed: | 4000 r.p.m. |
| Test time: | 20 hours |
| Circumferential speed: | 8.4 m/second |
| Lubricating oil temperature: | 120° C. |
| Lubricating oil pressure: | 3.0 kg/cm$^2$ |
| Lubricant: | motor oil #20 |

As will be apparent from the above test, according the present invention, the following advantages are obtained.

(1) The bearing aluminium alloys (No. 13–23) used in the present invention are able to withstand higher loads than the conventional bearing aluminium alloys (No. 1–11) without fatigue. Thus, it is understood that fatigue resistance strength and superior load-resistance are improved in the present invention.

(2) Bearings No. 6, 12 and 18 having the same composition are compared, only taking the heat treatment conditions into consideration. The advantage of a great improvement in fatigue strength cannot be observed in the alloy layers, such as No. 12, which are solution-treated at a temperature of 400° C. or less, whereas fatigue strength is greatly improved in bearing No. 18 of the present invention.

As will be understood from the foregoing description, superior load-resistance are greatly improved in the aluminium alloy used for the bearings of the present invention compared to the conventional alloys.

What is claimed is:

1. A multi-layered bearing having superior load-resistance comprising an aluminium base bearing alloy layer and a backing metal layer, said bearing alloy consisting essentially of, by weight, 2–8% zinc, 0.1–8% silicon, 0.1–3% copper, 0.05–3% magnesium and the balance of aluminium, wherein said multi-layered bearing is a product of solution heat treatment at a temperature of at least 450° C. and artificial aging treatment at a temperature of at most 250° C., and wherein said bearing alloy layer has a hardness of at least Hv 71.

2. A multi-layered bearing having superior load-resistance comprising an aluminium base bearing alloy layer and a backing metal layer, said bearing alloy consisting essentially of, by weight, 2–8% zinc, 0.1–8% silicon, 0.1–3% copper, 0.05–3% magnesium, at least one element selected from the following five elements consisting of 0.1–3% lead, 0.1–2% manganese, 0.1–2% vanadium, 0.1–2% chromium, 0.1–3% nickel, and the balance of aluminium wherein said multi-layered bearing is a product of solution heat-treatment at a temperature of at least 450° C. and artificial aging treatment at a temperature of at most 250° C., and wherein said bearing alloy layer has a hardness of Hv 71 or higher.

3. A multi-layered bearing having superior load-resistance comprising an aluminium base bearing alloy layer and a backing metal layer, said bearing alloy consisting essentially of, by weight, 2–8% zinc, 0.1–8% silicon, 0.1–3% copper, 0.05–3% magnesium, at least one element selected from the elements consisting of 0.005–0.5% strontium, 0.01–0.2% titanium, 0.001–0.05% boron, and the balance of aluminium wherein said multi-layered bearing is a product of solution heat-treatment at a temperature of at least 450° C. and artificial aging treatment at a temperature of at most 250° C., and wherein said bearing alloy layer has a hardness of Hv 71 or higher.

4. A multi-layered bearing having superior load-resistance comprising an aluminium base bearing alloy layer and a backing metal layer, said bearing alloy consisting essentially of, by weight, 2–8zinc, 0.1–8% silicon, 0.1–3% copper, 0.05–3% magnesium, at least one element selected from the following five elements consisting of 0.1–3% lead, 0.1–2% manganese, 0.1–2% vanadium, 0.1–2% chromium, 0.1–3% nickel, and at least one element selected from the elements consisting of 0.005–0.5 strontium, 0.01–0.2 titanium, 0.001–0.05% boron, and the balance of aluminium wherein said multi-layered bearing is a product of solution heat-treatment at a temperature of at least 450° C. and artificial aging treatment at a temperature of at most 250° C., and wherein said bearing alloy layer has a hardness of Hv 71 or higher.

5. A multi-layered bearing according to claim 1, wherein an intermediate bonding layer consisting of anyone of aluminium, an aluminium alloy and nickel intervenes between said bearing alloy layer and said backing metal layer.

6. A multi-layered bearing according to claim 2, wherein an intermediate bonding layer consisting of anyone of aluminium, an aluminium alloy and nickel intervenes between said bearing alloy layer and said backing metal layer.

7. A multi-layered bearing according to claim 3, wherein an intermediate bonding layer consisting of anyone of aluminium, an aluminium alloy and nickel intervenes between said bearing alloy layer and said backing metal layer.

8. A multi-layered bearing according to claim 4, wherein an intermediate bonding layer consisting of anyone of aluminium, an aluminium alloy and nickel intervenes between said bearing alloy layer and said backing metal layer.

9. A multi-layered bearing according to claim 1, wherein a layer of any one of tin, lead or an alloy thereof is formed as an overlay on said bearing alloy layer.

10. A multi-layered bearing according to claim 2, wherein a layer of any one of tin, lead or an alloy thereof is formed as an overlay on said bearing alloy layer.

11. A multi-layered bearing according to claim 3, wherein a layer of any one of tin, lead or an alloy thereof is formed as an overlay on said bearing alloy layer.

12. A multi-layered bearing according to claim 4, wherein a layer of any one of tin, lead or an alloy thereof is formed as an overlay on said bearing alloy layer.

13. A multi-layered bearing according to claim 1, wherein a flash plating layer consisting of any one of tin, lead or an alloy thereof is formed on the surface of said bearing.

14. A multi-layered bearing according to claim 2, wherein a flash plating layer consisting of any one of tin, lead or an alloy thereof is formed on the surface of said bearing.

15. A multi-layered bearing according to claim 3, wherein a flash plating layer consisting of any one of tin, lead or an alloy thereof is formed on the surface of said bearing.

16. A multi-layered bearing according to claim 4, wherein a flash plating layer consisting of any one of tin, lead or an alloy thereof is formed on the surface of said bearing.

\* \* \* \* \*